United States Patent Office 3,287,551
Patented Nov. 22, 1966

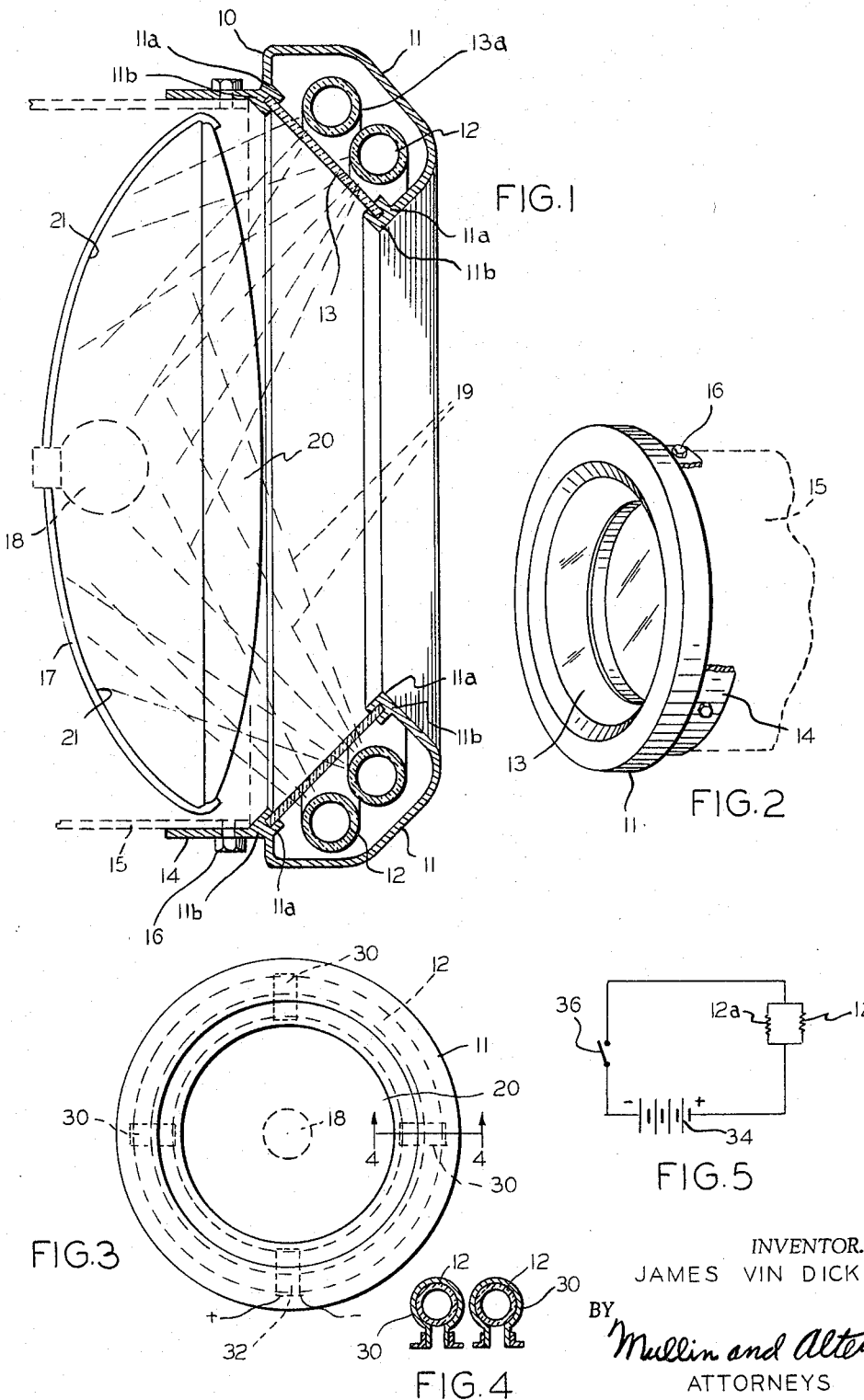

1

3,287,551
FOG LIGHTS
James Vin Dick, W-156, N-8027 Pilgrim Road,
Menomonee Falls, Wis.
Filed May 8, 1964, Ser. No. 365,981
4 Claims. (Cl. 240—41.1)

My invention relates to fog lights, and more particularly to a fog light construction that may be employed as an accessory to a conventional headlight on an automotive vehicle, or made a permanent part of the headlight.

The prime object of my invention is to provide a means of directing beams of yellow light into the reflector of a sealed-beam headlight, or the like.

It is an accepted fact that a beam of yellow light penetrates fog, or smog to provide easy visibility for the benefit of the driver of the oncoming vehicle. The device described and claimed herein, is designed to be applied to, or made a permanent part of, a standard conventional headlight in a manner whereby the driver of the automotive vehicle to which it is applied may actuate either the headlights when standard requirements are needed for regular driving, or actuate the yellow fog lights when necessary. The combination of the regular headlights with the yellow light beams reflected therein, produce a bright fog light when the conditions so demand.

The device is economical to manufacture, easy to install, and highly efficient for the purpose for which it is intended.

Other and further objects of my invention will become more apparent as the description proceeds, when taken in conjunction with the drawings, in which:

FIGURE 1, is a vertical cross-sectional view of the assembled device applied to a conventional headlight shown in phantom, FIGURE 2, is a perspective front view of the device applied to a conventional headlight.

FIGURE 3, is a front view of the device showing the circular yellow lights in phantom, FIGURE 4, is a sectional view taken along a plane passing through the line 4—4 and looking in the direction of the arrows, and FIGURE 5, is a schematic drawing illustrating how my fog lights are energized.

Similar characters of reference indicate corresponding parts throughout the several views, and referring now to the same, the character 10, shows a substantially circular frame bent at 11 to encase a pair of circular shaped fog lights shown as 12, and an angularly disposed transparent member shown as 13 which may be made of any material such as glass or plastic.

The frame is U-shaped with a light conduit opening 13a formed therein; and receiving means 11a at each side thereof extend angularly from the rims 11b of the U-shaped frame 11 throughout the periphery thereof. As seen from FIGURE 1, the transparent member 13 is received by the receiving means 11a.

The entire frame 10 is provided with a cylindrical portion 14 adapted to encase the outer shell of a conventional headlight casing 15 and attached thereto by means of bolts shown as 16, or in any other conventional and efficient manner.

The headlight 15 is shown encasing a conventional sealed-beam assembly 17, equipped with a conventional lamp 18.

In use the sealed-beam light 17 and the fog light 12, would be equipped with a separate source of current, so that they may be independenty actuated by the driver of the vehicle.

When the fog lights 12 are actuated, the rays shown

2 as 19, will reflect through the transparent member 13, against the lens shown as 20, in the sealed-beam lamp assembly 17, and through it against the reflector 21 forming a part thereof. In this manner the headlight will be caused to reflect a yellow light during a fog, or smog condition.

The device as described and claimed herein is exceedingly simple and easy to operate as a conventional headlight on the vehicle, or it may be employed as an additional convenience as a fog light when the driving conditions warrant its use. Thus it may be installed onto a conventional headlight as an accessory, or it may be constructed to be an integral part thereof.

Of course the fog lights 12 can be associated with the frame and with means for selectably energizing them in many known ways as illustrated in FIGURE 4. I preferably mount the fog lights onto the frame with the brackets 30; and a main socket connection 32 is attached to each end of the fog lights, as illustrated in FIGURE 3. In FIGURE 5 I show a wiring diagram which has the headlights represented as resistors 20 hooked up in parallel circuit with a self contained battery 34 and a switch 36. It will therefore be seen that with this arrangement, the fog lights 12 operate independently of the headlight and independently of each other.

Although I have shown a specific construction and arrangement of the parts constituting the invention, I am fully cognizant of the fact that many changes in the form shape, or contour of the parts may be made without effecting their operativeness, and I reserve the rights to make such changes as I may deem convenient or necessary, without departing from the spirit of my invention, or the scope of the appended claims.

For instance it is entirely possible to practice my invention without having a transparent member 13 associated with my frame member at the light conduit opening. However, I have found that with this transparent member my device is more suitable for operation because the transparent member acts as an encasement for the frame. Also the specific shape of the frame member 11 defined herein is not necessary for practicing my invention. I intend this invention to include all shapes of frames that are associatable with the front of a headlight and that have light conduit openings therein with structure that directs the fog light's beams against the reflector of a headlight so that when the frame is associated with the headlight, light is reflected from the headlight and can shine outward from the frame by having an opening at the front thereof.

Having thus described my invention, what I claim and desire to secure by Letters Patent in the United States, is:

1. A fog light construction for use in combination with a conventional motor vehicle headlight assembly having a reflector disposed in and contained by an annular housing, said construction comprising: a frame having an annular body portion bent around a central opening to provide an opaque frontal section, an opaque rim section, and an open rearward section, said frontal section and said rim section coacting to define an annular chamber to encase at least one circular shaped fog light therein, said body portion having holding means on the inner surface thereof for receiving and holding a circular shaped fog light therein in detachable spaced relationship thereto, said frame further having a rearwardly extending generally cylindrical sleeve for receiving therein and circumscribing the annular housing of the headlight assembly; securing means for detachably securing said sleeve to said annular housing when said sleeve is in said circumscribing relationship thereto; at least one circular shaped fog light removably mounted in said holding means behind said opaque frontal section and in direct communicative relationship, via said open rearward section, with the reflector of the headlight assembly, means for selectively energizing said fog light to cause illumination thereof independently of the illumination of the headlight assembly; and control means for activating said energizing means to illuminate said fog light and cause light therefrom to pass through said open rearward section on to the reflector of the headlight assembly and, hence, by reflection, forwardly through said central opening.

2. A fog light construction, as defined in claim 1, wherein said frame is generally U-shaped in cross-section with the so-called top edges of the U providing edges for the frame member and the open rearward section.

3. A fog light construction, as defined in claim 2 in which said U-shaped frame has angularly disposed receiving means at each edge thereof projecting toward each other in opposing relationship and extending throughout the periphery thereof; and an annular transparent member having its inner and outer edges each respectively received by and coextensive with a different one of said angularly disposed receiving means, whereby said transparent member protects said fog light from damage by passing foreign objects without diminishing the transmission of illumination therefrom.

4. A fog light construction, as defined in claim 1, wherein there are a plurality of fog lights associated in parallel circuit with said means for selectably energizing said fog lights, said means for selectably energizing said fog lights including a circuit of a switch means and a self contained battery, whereby said fog lights can be turned on and off independently of said headlight and said fog lights operate independently of each other.

References Cited by the Examiner
UNITED STATES PATENTS

| | | | |
|---|---|---|---|
| 1,935,729 | 11/1933 | Rosenbaum | 240—41.1 |
| 2,501,405 | 3/1950 | Noel | 240—1.3 |
| 3,764,673 | 9/1956 | McClintock | 240—51.12 X |

NORTON ANSHER, *Primary Examiner.*

C. R. RHODES, *Assistant Examiner.*